Patented June 26, 1923.

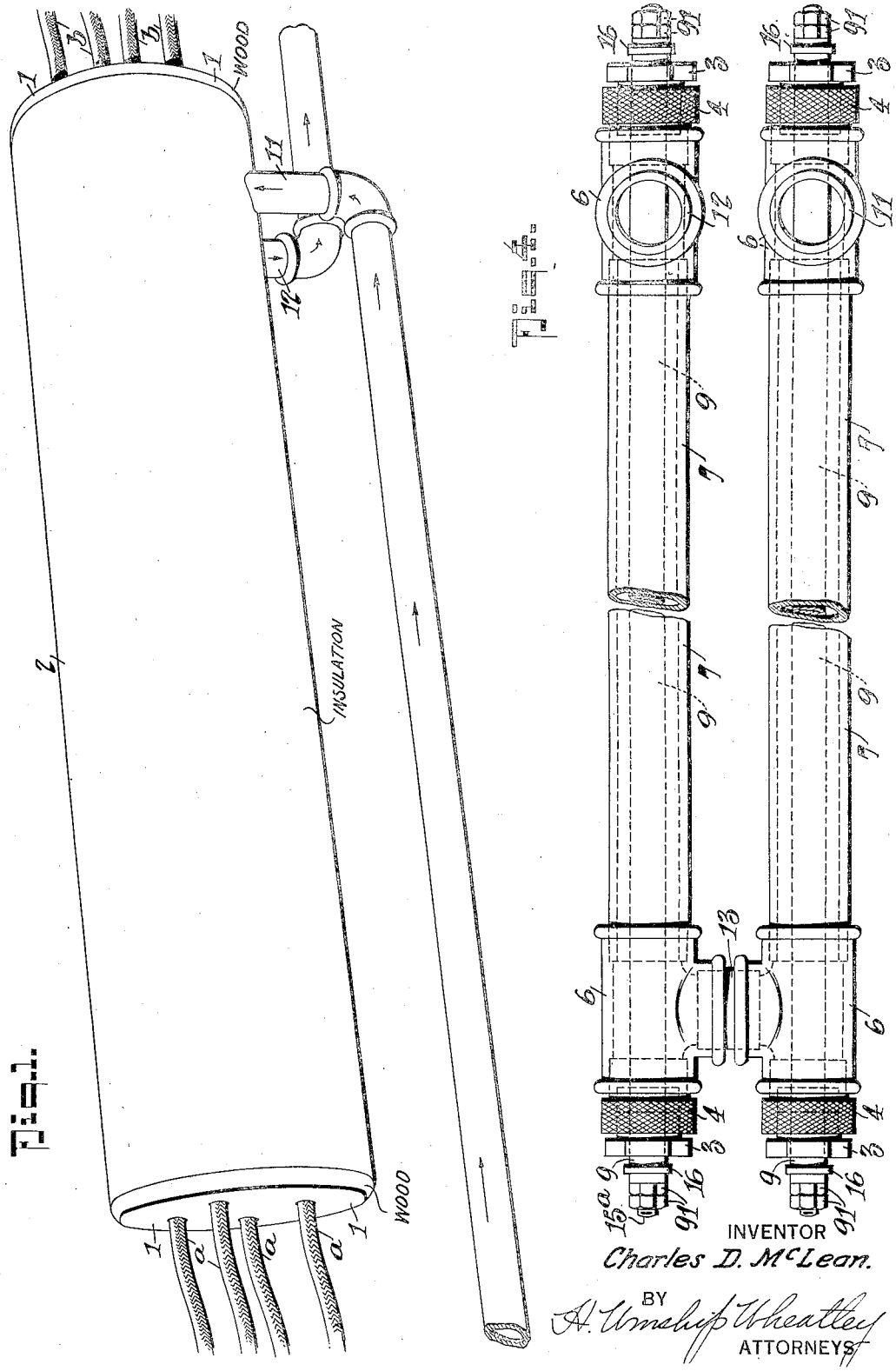

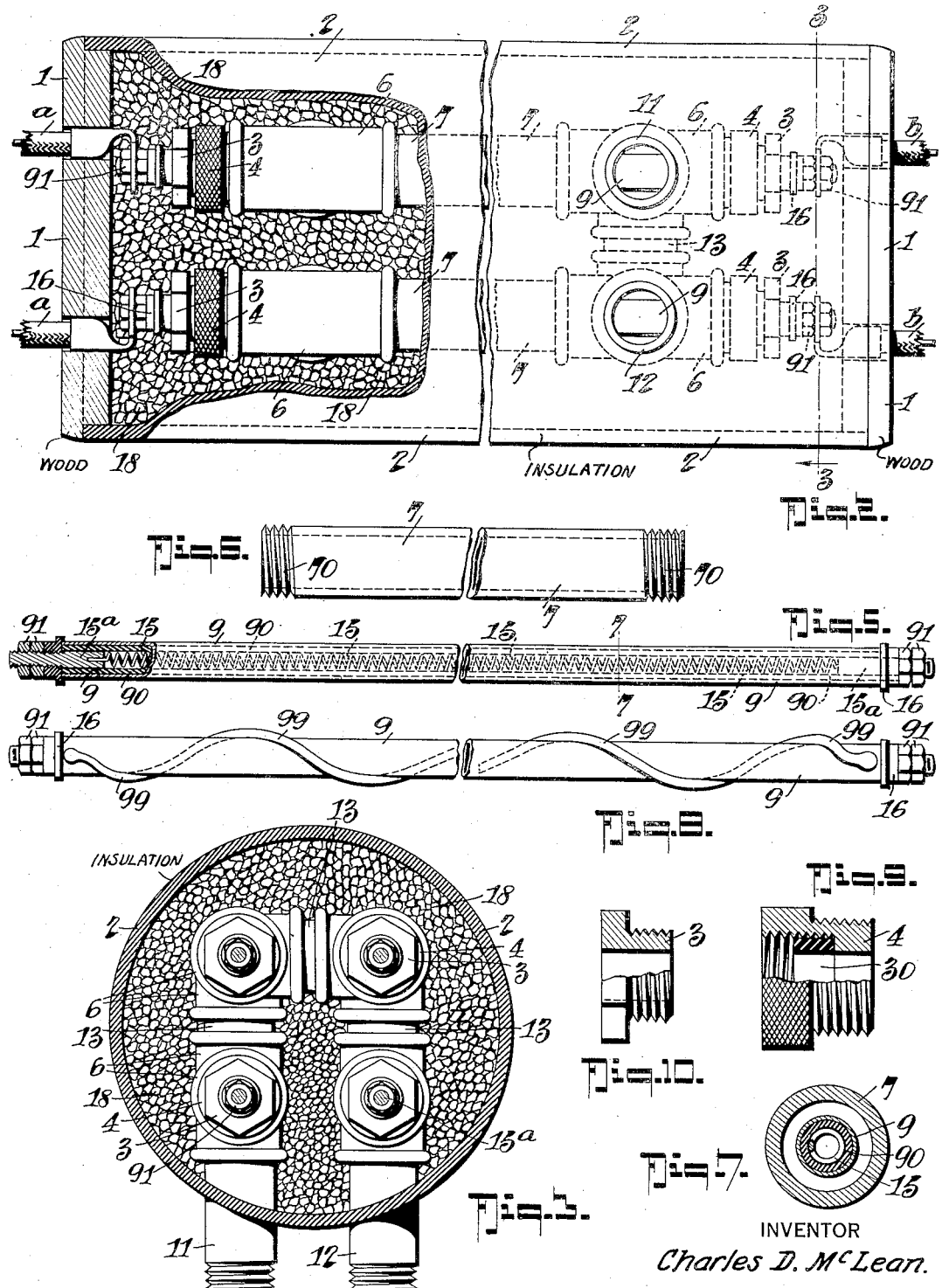

1,460,025

UNITED STATES PATENT OFFICE.

CHARLES D. McLEAN, OF BERLIN, NEW HAMPSHIRE, ASSIGNOR TO MECHANICAL & ELECTRICAL MANUFACTURING CO., INCORPORATED, OF BERLIN, NEW HAMPSHIRE.

INSTANTANEOUS HEATER.

Application filed May 18, 1922. Serial No. 561,940.

*To all whom it may concern:*

Be it known that I, CHARLES D. McLEAN, a citizen of the United States, residing at Berlin, in the county of Coos and State of New Hampshire, have invented a new and useful Instantaneous Heater, of which the following is a specification.

My invention, which relates to that class of heating appliances wherein the water or other liquids are confined within a casing and caused, in the passage thereof through the casing, to circulate around and in contact with an electrically energized heating cartridge or unit, seeks to provide an improved heating means of the kind stated, of a relatively simple and economical construction, one that can be readily installed, in an inexpensive way, in the house water service pipe and which is effective and practically instantaneous in action.

Another object of my invention is the provision, in a heating appliance of the character mentioned, of an improved arrangement of the encasing elements for the heating unit proper, whereby to retain the heat within the appliance and protect the device against injury during the operation of assembling the parts thereof and when such parts are in practical use.

With other objects in view, that will hereinafter be explained, my present invention embodies a quick acting electrically energized means for pre-heating crude oils for furnace purposes and other similar liquids, as well as water, that comprises the peculiar features of construction and novel combination of parts, all of which will be fully detailed in the following explanation, specifically mentioned in the appended claims and illustrated in the accompanying drawings, in which:

Figure 1 is a perspective view of my improved construction of heater in its complete form.

Figure 2 is an inverted plan view thereof, parts being shown in section.

Figure 3 is a cross section on the line 3—3 on Figure 2.

Figure 4 is a plan view of a pair of heating units connected in series for being mounted within the encasing elements.

Figure 5 is a side view of one of the heating units and the casing therefor.

Figure 6 is a detail view of the outside casing for the heating unit.

Figure 7 is a cross section on an enlarged scale taken on the line 7—7 of Figure 5 with the outside casing shown in Figure 6 in operative arrangement.

Figure 8 is a detail side elevation of a modified form of heating unit hereinafter specifically referred to.

Figures 9 and 10 are detail views of the stuffing box and gland nut members hereinafter mentioned.

In the practical development of my present invention, the heating device in its complete shape includes a tube or casing 2 within which the heating units, when at their assembled condition, are contained, as is clearly illustrated in Figures 1, 2 and 3, from which it will also be observed that when the parts have been operatively connected within the casing 2, the ends of such casing are closed by wooden end caps 1—1, as shown.

The casing 2 is preferably of fibrous or other like materials, which tend to render the tube moisture proof, electrically non-conductive, and strong and durable, and for insulating the heating units contained within the casing against the cold outside air and also to retain the heat that radiates from the heating element, the said casing 2 is filled with cork, or other like substance 18, within which the outside heating elements are embedded, as is best shown in Figures 2 and 3. Providing the casing 2 with a filler 18, as stated, the heating elements within the casing are protected against injury by the casing are protected against injury by contacting shocks or jars against the outside of the casing when the appliance is practically applied.

While a single heating unit constructed in the manner presently described, and as is clearly illustrated in Figures 5, 6 and 7, may be used for heating water and other liquids, I prefer to use a plurality of such heating units which may be a single pair of units connected in series, as shown in Figure 4, or a larger number of such units connected up in series in the manner illustrated in Figures 1, 2 and 3, in which figures four units are shown as operatively connected in series in a manner for causing the liquid being heated to pass completely through all four units in its course from the inlet through the heating elements and back out through the outlet of the casing 2, as will be presently fully explained.

Each heating unit (one of which is best shown in detail in Figures 5, 6 and 7, as before mentioned) consists of an inner tube or casing 9 which is provided with an internal insulating tubular lining 90. Within the tube or casing 9 is contained the heating element proper, which consists of rod-like end portions 15ª—15ª that are joined by a spiral shaped body 15 whose outer ends connect with the said portions 15ª—15ª, as shown.

The said outer ends 15ª—15ª of the heating element are threaded to receive clamp nuts 91 for making the connections with the electrical wire terminals a—b.

Each of the heating units includes an outer casing or water circulating tube 7 and the said tube 7, for the several heating units, of which they constitute parts, are of less length than their respective inner tubes or casings 9 and when connected in series, as shown in the drawings, the outside tubes 7 have their opposite ends 70 threaded into T couplings 6—6, it being understood from Figures 3 and 4 that when the parts that constitute the entire heating appliance are assembled the opposing T couplings 6—6 at one end are joined by a nipple connection 13.

The inner tubes 9, before referred to, have their ends projected through the couplings 6—6 and to provide for readily joining the circuit wire terminals a—b and also for a proper circulation or passing of the water or other liquid along and around the different heating units, the several couplings 6 have their outer ends fitted with stuffing boxes 4 and glands 3, washers 30 being also used in connection with the boxes 4 and glands 3 to effect the desired water-tight closure of the parts.

One of the couplings 6, at one end of the complete appliance, has an inlet pipe connection 11 and the opposing coupling 6 at the same end has an outlet pipe connection 12; it being obvious by referring to Figures 2 and 3 that the water or other liquid that enters the inlet 11 flows along through each successive one of the plurality of heating units, and in its thoroughly heated condition, passes from the outlet 12 back into the service or house supply connection.

In practice, the end caps 1—1 for the main casing are provided with suitably insulated apertures for the passage of the circuit wires a—b to their connections with the heating unit.

While the simple form of heating unit shown in Figure 5 is best adapted for heating oils and similar liquids and may be used for heating water, when the appliance is particularly designed as an instantaneous water heater, the inner tube 9 of each heating unit is provided with an external spiral baffle 99 (see Figure 8) the said spiral baffle causing the water, as it passes from one end of the unit to the other, to whirl through the water space between the inner and outer tubes 9 and 7 of the unit, the said spiral baffles causing the water to travel in its movement toward the outlet of the heater one-third further than it would travel if the surface of the tube 9 were plain.

If the device is to be used for pre-heating oil and other like liquids, the plain surface tubes 9 are preferably used as a part of the heating unit, but when the device is to be used for heating water, the casing or tube 9 with its spiral baffles is best suited for such purposes.

From the drawings it will be seen that the heating coil 15 is suitably insulated so as to insure against loss of energy or the energizing of the liquid, by the insulating tube 90 and end collars 16.

From the foregoing description, taken in connection with the accompanying drawings, it is believed that the complete construction, the manner of its use and the advantages of my present invention will be readily apparent to those familiar with the construction or the use of heating appliances of the general type mentioned.

What I claim is:

1. A heating appliance of the character stated comprising two independent pairs of heating units, each of which units including a heating core and a water passage surrounding the core, means insulating the core from the water passage, the several water passages being arranged in series and in communication and terminating with an inlet at one end and with an outlet at the other end for connection with a supply or service pipe.

2. In heating appliances of the character described, a heating unit that comprises an inner tube or casing, a heating element that extends through the said tube and has its opposite ends adapted for connection with the terminals of an electric circuit, an outer casing that surrounds and is spaced apart from the aforesaid inner casing and which constitutes the fluid passage, an inlet connected with one end of the said passage and an outlet connected with the other end of the said passage, the said inner tube having a fluid baffling external surface that extends the length thereof.

3. As a new article, a heating unit for instantaneous electric heating appliances comprising an inner tube, a metal core supported within the said inner tube, means for insulating the said core from the tube, the opposite ends of the core being extended beyond the tube ends, the said projected ends having attached means for connecting them to the terminals of an electric circuit, an outer casing that surrounds the inner casing, the said outer casing being held spaced apart from the inner casing whereby to provide a fluid passage between the two casings, and an intake and outlet in communication with the said fluid passage.

4. As a new article, a heating unit for instantaneous electric heating appliances comprising an inner tube, a metal core supported within the said inner tube, means for insulating the said core from the tube, the opposite ends of the core being attached beyond the tube ends, the said projected ends having attached means for connecting them to the terminals of an electric circuit, an outer casing that surrounds the inner casing, the said outer casing being held spaced apart from the inner casing whereby to provide a fluid passage between the two casings, an intake and outlet in communication with the said fluid passage, a container within which the said heating unit is held, the ends of the said container being apertured for the passage therethrough of the aforesaid inlets and outlets to the fluid passage of the heater.

5. In an instantaneous heating appliance of the character described, a heating element comprising a core, an inner casing that surrounds the core, means for insulating the said inner casing from the core, the latter having its opposite ends projected beyond the said casing and adapted for being electrically connected with the terminals of an energizing circuit, an outer casing within which the inner casing is contained, the said inner and outer casings being spaced apart to provide a fluid passage that extends the length of the outer casings, said passage being provided with an intake and exhausting connection that join with the opposing ends of the said fluid passage.

6. In an instantaneous heating appliance of the character described, a plurality of heating units connected in series, the said series of units having an inlet and an outlet for connecting with a fluid service pipe, each heating unit including an inner tubular casing and a heating core contained within and insulated from the said inner casing, the opposite ends of the said core extending beyond the ends of their respective inner tube, outer tubular casings, one of said outer casings surrounding each inner tubular casing and union joints that connect the ends of the outer tubular casings with each other whereby to provide for a continuous passage of the fluid from the inlet end to the outlet ends of the said fluid passages between the tubes, the outer projected ends of the core extending beyond the union joints and having attached means for coupling up with the terminals of an electric circuit.

7. In an instantaneous heating appliance of the character described, a plurality of heating units connected in series, the said series of units having an inlet and an outlet for connecting with a fluid service pipe, each heating unit including an inner tubular casing and a heating core contained within and insulated from the said inner casing, the opposite ends of the said core extending beyond the ends of their respective inner tube, outer tubular casings, one of said casings surrounding each inner tubular casing and union joints that connect the ends of the outer tubular casings with each other whereby to provide for a continuous passage of the fluid from the inlet end to the outlet ends of the said fluid passages between the tubes, the outer projected ends of the core extending beyond the union joints and having attached means for coupling up with the terminals of an electric circuit, and a container within which the heating elements are mounted.

8. In an instantaneous heating appliance of the character described, a plurality of heating units connected in series, the said series of units having an inlet and an outlet for connecting with a fluid service pipe, each heating unit including an inner tubular casing and a heating core contained within and insulated from the said inner casing, the opposite ends of the said core extending beyond the ends of their respective inner tube, outer tubular casings, one of said outer casings surrounding each inner tubular casing and union joints that connect the ends of the outer tubular casings with each other whereby to provide for a continuous passage of the fluid from the inlet end to the outlet ends of the said fluid passages between the tubes, the outer projected ends of the core extending beyond the union joints and having attached means for coupling up with the terminals of an electric circuit, a container within which the heating elements are mounted, and a cork filler in the container within which the heating elements are embedded.

CHARLES D. McLEAN.